(12) United States Patent
Uchino et al.

(10) Patent No.: US 9,781,689 B2
(45) Date of Patent: Oct. 3, 2017

(54) MOBILE COMMUNICATION SYSTEM (71) Applicant: NTT DOCOMO, INC., Tokyo (JP)

(72) Inventors: Tooru Uchino, Tokyo (JP); Hideaki Takahashi, Tokyo (JP); Kazuki Takeda, Tokyo (JP); Yuichi Kakishima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/029,803

(22) PCT Filed: Oct. 10, 2014

(86) PCT No.: PCT/JP2014/077139
§ 371 (c)(1),
(2) Date: Apr. 15, 2016

(87) PCT Pub. No.: WO2015/056639
PCT Pub. Date: Apr. 23, 2015

(65) Prior Publication Data
US 2016/0255595 A1 Sep. 1, 2016

(30) Foreign Application Priority Data
Oct. 16, 2013 (JP) .................. 2013-215481

(51) Int. Cl.
*H04W 52/34* (2009.01)
*H04W 52/36* (2009.01)
(Continued)

(52) U.S. Cl.
CPC ......... *H04W 52/365* (2013.01); *H04W 16/32* (2013.01); *H04W 52/04* (2013.01);
(Continued)

(58) Field of Classification Search
CPC .................. H04W 52/346; H04W 52/322
(Continued)

(56) References Cited

U.S. PATENT DOCUMENTS

| 8,811,266 B2 * | 8/2014 | Choi ............... H04W 72/1231 |
| | | 370/318 |
| 2008/0254819 A1 * | 10/2008 | Niwano ............... H04W 52/16 |
| | | 455/522 |

FOREIGN PATENT DOCUMENTS

| JP | 2013-085247 A | 5/2013 |
| JP | 2013-531433 | 8/2013 |

(Continued)

OTHER PUBLICATIONS

International Search Report issued in PCT/JP2014/077139 mailed on Dec. 22, 2014 (2 pages).
(Continued)

Primary Examiner — John J Lee
(74) Attorney, Agent, or Firm — Osha Liang LLP (57) ABSTRACT

Transmission power control on a mobile station (UE) is appropriately performed when "Inter-eNB CA" is performed by using cells under control of plural radio base stations (eNB). In a mobile communication system according to the present invention, a specific radio base station (eNB#1) among plural radio base stations (eNB#1, eNB#2) performs scheduling control and transmission power control on a mobile station (UE) in all the cells (#1, #2A to #2C) under the control of the plural radio base stations (eNB#1, eNB#2).

9 Claims, 8 Drawing Sheets (51) Int. Cl.

| | | |
|---|---|---|
| *H04W 16/32* | (2009.01) | |
| *H04W 52/04* | (2009.01) | |
| *H04W 72/12* | (2009.01) | |
| *H04W 52/08* | (2009.01) | |
| *H04W 74/00* | (2009.01) | |
| *H04W 92/20* | (2009.01) | |
| *H04L 5/00* | (2006.01) | |
| *H04W 52/14* | (2009.01) | |

(52) U.S. Cl.
CPC ......... *H04W 52/08* (2013.01); *H04W 52/367* (2013.01); *H04W 72/12* (2013.01); *H04W 74/004* (2013.01); *H04L 5/001* (2013.01); *H04W 52/146* (2013.01); *H04W 52/34* (2013.01); *H04W 92/20* (2013.01)

(58) Field of Classification Search
USPC ................................. 455/452.1, 509, 522, 69
See application file for complete search history.

(56) References Cited

U.S. PATENT DOCUMENTS

| | | | | |
|---|---|---|---|---|
| 2011/0243085 | A1* | 10/2011 | Seo ....................... | H04W 52/40 370/329 |
| 2013/0114457 | A1 | 5/2013 | Han et al. | |
| 2014/0192759 | A1* | 7/2014 | Son ..................... | H04W 72/042 370/329 |

FOREIGN PATENT DOCUMENTS

| | | |
|---|---|---|
| JP | 2013-187647 A | 9/2013 |
| WO | 2012/059310 A1 | 5/2012 |
| WO | 2012/091651 A1 | 7/2012 |
| WO | 2012/166975 A1 | 12/2012 |
| WO | 2013116988 A1 | 8/2013 |

OTHER PUBLICATIONS

Written Opinion of the International Searching Authority issued in PCT/JP2014/077139 mailed on Dec. 22, 2014 (6 pages).

Intel Corporation; "Further throughput evaluation and comparison of with and without UP bearer split for non-ideal backhaul"; 3GPP TSG RAN WG2 Meeting #83bis, R3-133629; Ljubljana, Slovenia; Oct. 7-11, 2013 (9 pages).

NSN, Nokia Corporation; "Performance of bearer split with non-ideal backhaul"; 3GPP TSG-RAN WG2 Meeting #83, R2-132897; Barcelona, Spain; Aug. 19-23, 2013 (6 pages).

Samsung; "Scheduling Information handling in inter-ENB carrier aggregation"; 3GPP TSG-RAN WG2 Meeting #83bis, R2-133259; Ljubljana, Slovenia; Oct. 7-11, 2013 (2 pages).

Huawei, HiSilicon; "Throughput results for inter-frequency deployment of small cells"; 3GPP TSG-RAN WG2 Meetings #82, R2-131782; Fukuoka, Japan; May 20-24, 2013 (5 pages).

Office Action issued in the counterpart Japanese Patent Application No. 2013-215481, mailed Jan. 31, 2017 (6 pages).

LG Electronics Inc.; "Management of UE Transmit Power in Dual Connectivity"; 3GPP TSG-RAN2 Meeting #83bis, R2-133538; Ljubljana, Slovenia, Oct. 7-11, 2013 (2 pages).

European Search Report issued in the counterpart European Patent Application No. 14853745.9, mailed Sep. 7, 2016 (9 pages).

* cited by examiner

MOBILE COMMUNICATION SYSTEM

TECHNICAL FIELD

The present invention relates to a mobile communication system.

BACKGROUND ART

Figure 7:
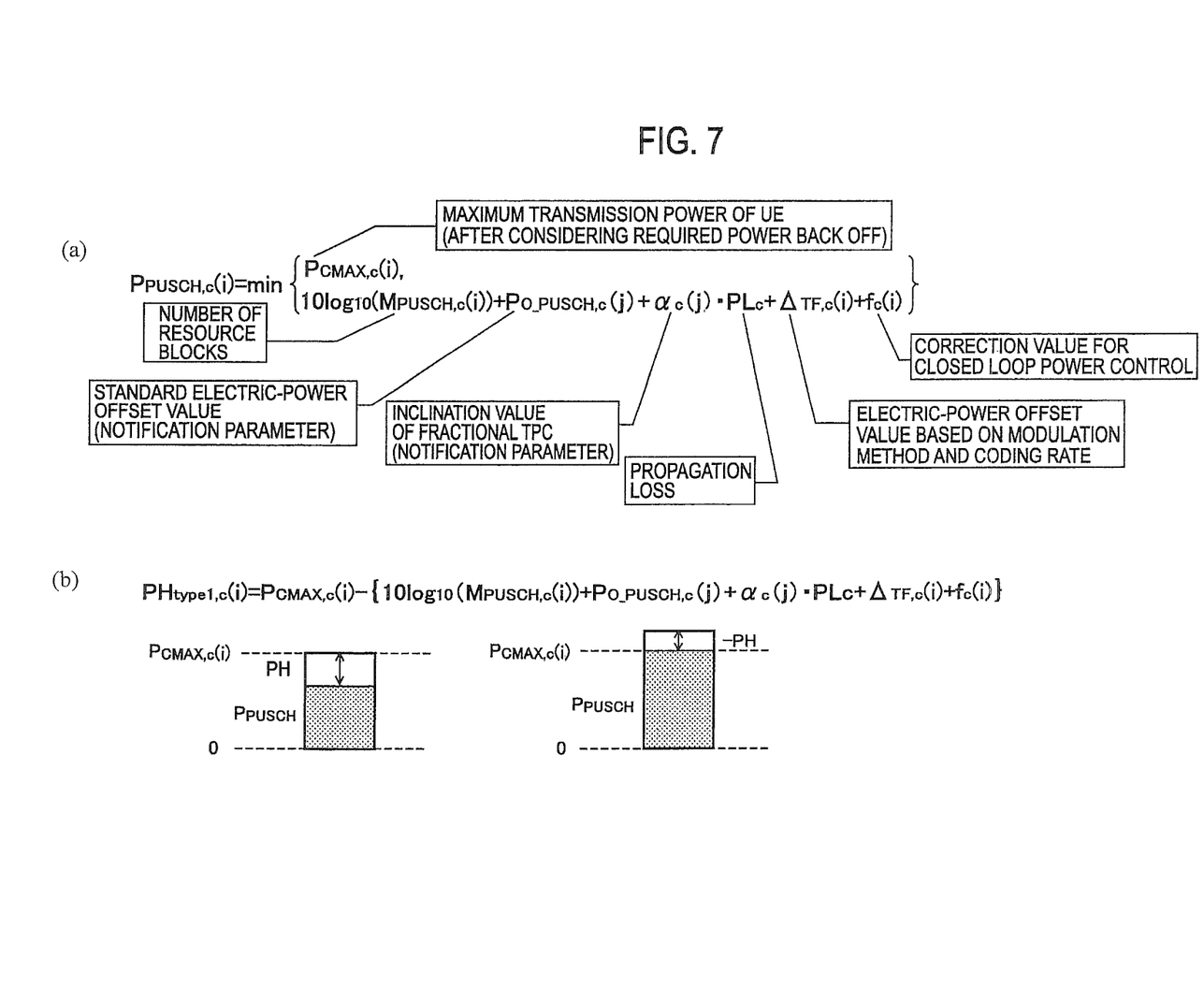
FIG. 7 is a view for explaining a conventional technology.

In the LTE (Long Term Evolution) system, a mobile station UE#i determines, based on a formula shown in FIG. 7 (a), a transmission power $P_{PUSCH,c}(i)$ of PUSCH (Physical Uplink Shared Channel) in a cell (or CC: Component Carrier) #c for every TTI (Transmission Time Interval).

Among the variables included in the formula shown in FIG. 7 (a), $P_{cmax,c}(i)$ is a maximum transmission power of the mobile station UE#i after considering a required power back-off in a cell #c; $M_{PUSCH,c}(i)$ is number of resource blocks assigned to the mobile station UE#i in the cell #c; $P_{o\_PUSCH,c}(j)$ is a standard electric-power offset value notified in the cell #c; $\alpha_c(j)$ is an inclination value of Fractional TPC (Transmission Power Control) notified in the cell #c; $PL_C$ is a propagation loss (path loss) in the cell #c measured by the mobile station UE#i; $\Delta_{TF,c}(i)$ is an electric-power offset value determined based on a modulation method and a coding rate used in the mobile station UE#i; and $f_c(i)$ is a correction value for closed loop power control used in the mobile station UE#i.

Among the variables included in the formula shown in FIG. 7(a), the propagation loss $PL_c$ is unknown to a radio base station eNB. Therefore, when the propagation loss $PL_c$ changes, the mobile station UE#i feeds back PHR (Power Headroom Report) as shown in FIG. 7(b).

PH is a difference between the maximum transmission power $P_{cmax,c}(i)$ of the mobile station UE#i and a current transmission power $P_{PUSCH,c}(i)$ of the mobile station UE#i calculated by using the formula shown in FIG. 7(a). The calculated difference may be a positive or a negative value.

Figure 8:
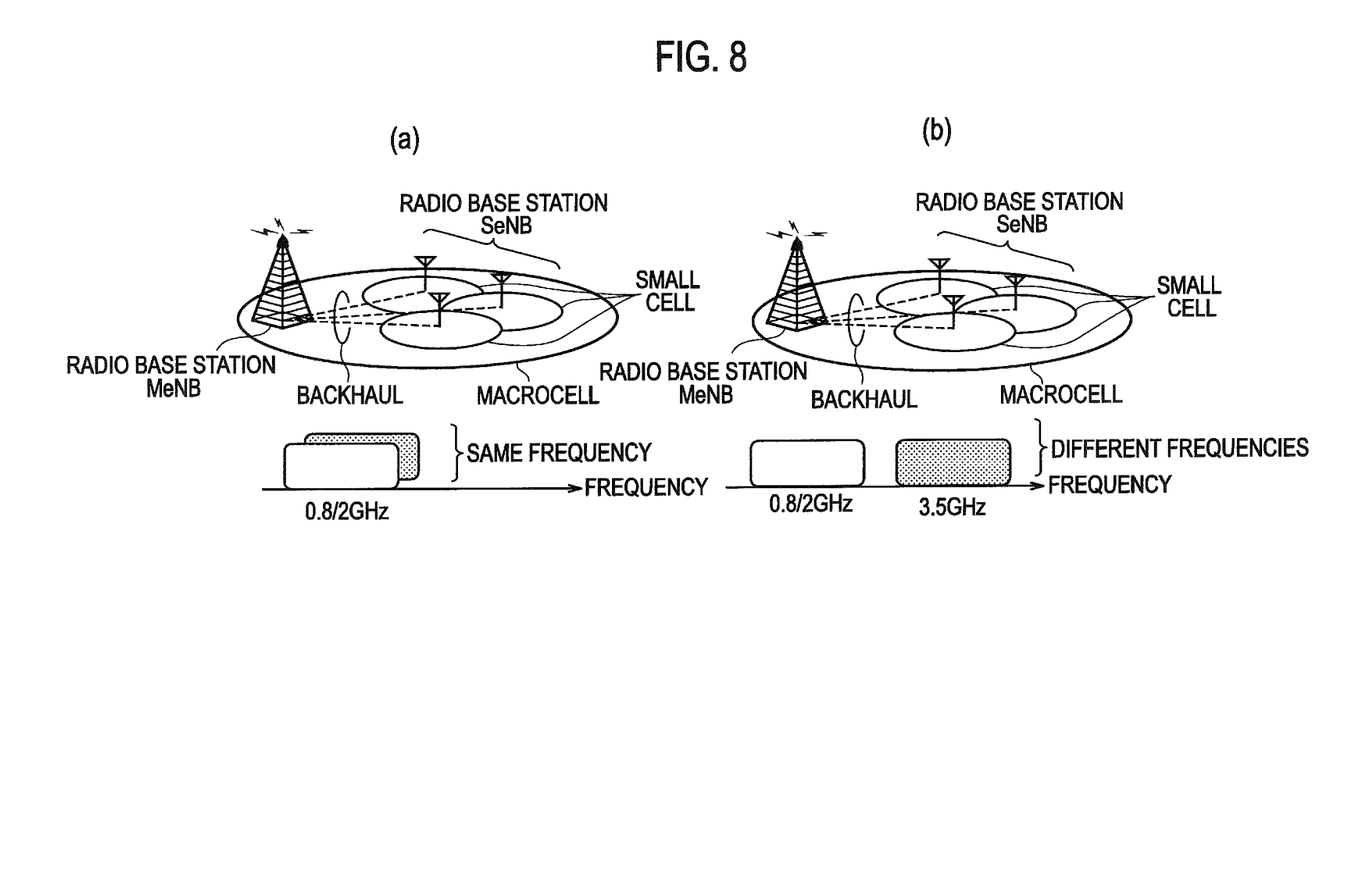
FIG. 8 is a view for explaining a conventional technology.

Moreover, in a mobile communication system of the LTE system, as shown in FIGS. 8(a) and 8(b), an overlaying configuration in which small cells are deployed on the coverage of a macrocell that uses an existing frequency (for example, 0.8/2 GHz) can be used.

The small cells, as shown in FIG. 8(a), can operate at the same frequency as that of the macrocell, or can operate at a different frequency (for example, 3.5 GHz) from that of the macrocell, as shown in FIG. 8(b).

Moreover, the small cells can be operated by a remote radio equipment (RRE) that is centrally controlled by a radio base station MeNB that controls the macrocell, or can be operated by a radio base station SeNB that differs from the radio base station MeNB, as shown in FIGS. 8(a) and 8(b).

The radio base station MeNB and the radio base station SeNB are connected via a backhaul line, in which delay time cannot be ignored, and these radio base stations mutually exchange the information. A transmission delay of the backhaul can be up to few tens of microseconds.

Moreover, in Release-12 of the LTE system, CA (Carrier Aggregation) used till Release-10 of the LTE system has been expanded, and performing "Inter-eNB CA", in which high throughput can be achieved by performing a simultaneous communication using cells (or CC) under the control of plural radio base stations eNB that are connected via the backhaul is being studied (see Non-Patent Document 1).

PRIOR ART DOCUMENT

Non-Patent Document

Non-Patent Document 1: 3GPP Contribution R2-131782

SUMMARY OF THE INVENTION

However, in the "Inter-eNB CA" that is currently being studied, among plural radio base stations eNB, scheduling control or transmission power control is independently performed, and therefore, had a problem where each radio base station eNB could not completely comprehend a status of a transmission power of a mobile station UE#i.

Figure 9:
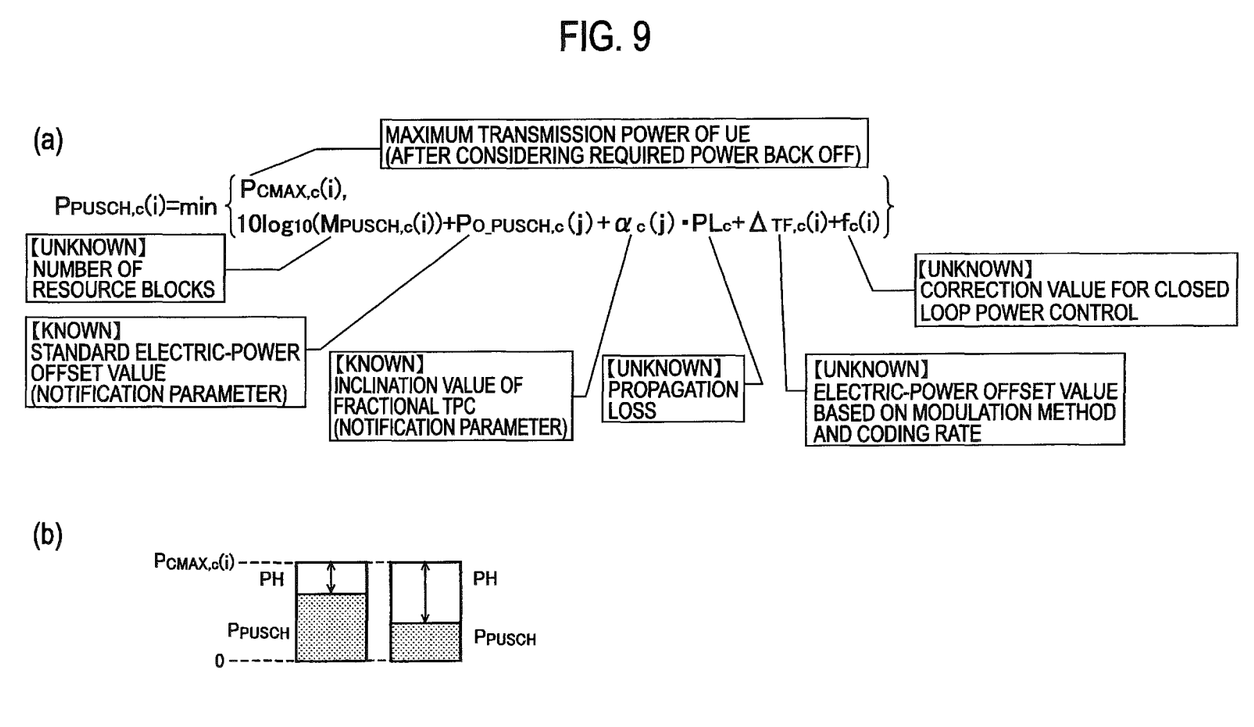
FIG. 9 is a view for explaining a conventional technology.

Specifically, as shown in FIG. 9(a), for each radio base station eNB, variables used in cells under the control of other radio base station eNB, particularly, number of resource blocks $M_{PUSCH,c}(i)$, a propagation loss $PL_c$, an electric-power offset value $\Delta_{TF,c}(i)$, and a closed loop power control value $f_c(i)$ are unknown. Therefore, as shown in FIG. 9(b), there was a problem that each radio base station eNB could not estimate, even after receiving the PHR in cells under the control of other radio base station eNB from a mobile station UE, the status of the transmission power of the mobile station UE#i in the cells.

The present invention has been made in view of the above circumstances. It is an object of the present invention to provide a mobile communication system that can appropriately perform transmission power control on a mobile station UE when performing "Inter-eNB CA" by using cells under the control of plural radio base stations eNB.

According to a first aspect of the present embodiment, in a mobile communication system in which a mobile station is configured to perform carrier aggregation by using cells under control of plural radio base stations, a specific radio base station among the plural radio base stations performs scheduling control and transmission power control on the mobile station in all the cells under the control of the plural radio base stations.

According to a second aspect of the present embodiment, in a mobile communication system in which a mobile station is configured to perform carrier aggregation by using cells under control of plural radio base stations, each of the plural radio base stations performs scheduling control and transmission power control on the mobile station in a cell under the control of itself, the plural radio base stations exchange scheduling information corresponding to the mobile station thereamong, and only one of the radio base stations performs the scheduling control on the mobile station at a same timing.

According to a third aspect of the present embodiment, in a mobile communication system in which a mobile station is configured to perform carrier aggregation by using cells under control of plural radio base stations, the mobile station reports, when a predetermined variable changes more than a predetermined threshold value, a change amount of the predetermined variable to at least one of the plural radio base stations, the predetermined variable includes number of resource blocks assigned to the mobile station in each of the cells under the control of the plural radio base stations, a propagation loss in each of the cells under the control of the plural radio base stations, an electric-power offset value determined based on a modulation method and a coding rate used in each of the cells under the control of the plural radio base stations, and a correction value for closed loop transmission power control used in each of the cells under the control of the plural radio base stations.

According to a fourth aspect of the present embodiment, in a mobile communication system in which a mobile station is configured to perform carrier aggregation by using cells under the control of plural radio base stations, a maximum transmission power of the mobile station in each of the cells is reduced.

DETAILED DESCRIPTION

First Embodiment of Present Invention

Figure 1:
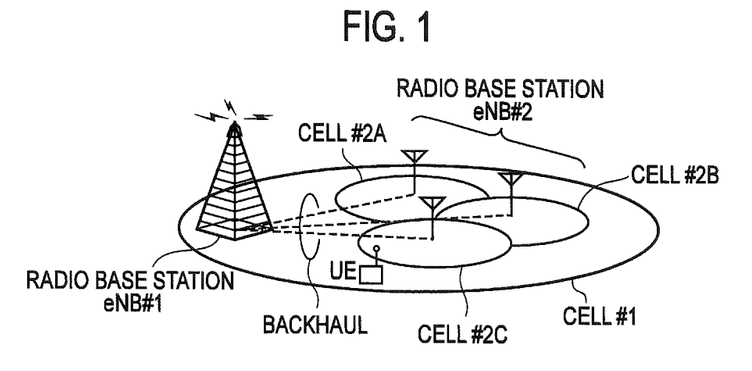
FIG. 1 is an overall schematic diagram of a mobile communication system according to a first embodiment of the present invention.
Figure 2:
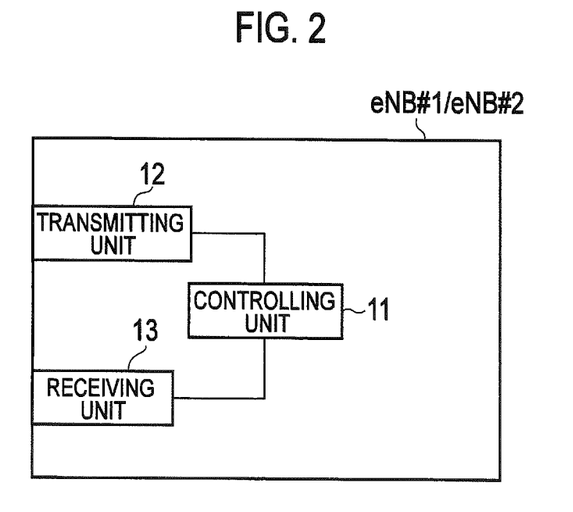
FIG. 2 is a functional block diagram of a radio base station eNB#1 or eNB#2 according to the first embodiment of the present invention.

Referring now to FIGS. 1 and 2, a mobile communication system according to a first embodiment of the present invention will be explained below. The mobile communication system according to the present embodiment will be explained with an example of a mobile communication system of the LTE system. The present invention, however, can be applied to a mobile communication system other than that of the LTE system.

As shown in FIG. 1, the mobile communication system according to the present embodiment includes a radio base station eNB#1 that controls a cell #1, and a radio base station eNB#2 that controls cells #2A to #2C.

In the mobile communication system according to the present embodiment, the radio base station eNB#1 is a master radio base station (or, a macro radio base station) MeNB, and the radio base station eNB#2 is a slave radio base station (or, a small radio base station) SeNB.

Moreover, in the mobile communication system according to the present embodiment, the cell #1 is a macrocell, and the cells #2A to #2C are small cells. In the cell #1, CC#1 is used, and in the cells #2A to #2C, CC#2 is used.

Furthermore, in the mobile communication system according to the present embodiment, a mobile station UE performs "Inter-eNB CA" by using the cell #1 (CC#1) under the control of the radio base station eNB#1 and the cells #2A to #2C (CC#2) under the control of the radio base station eNB#2.

As shown in FIG. 2, the radio base station eNB#1 or eNB#2 includes a controlling unit 11, a receiving unit 12, and a transmitting unit 13.

The controlling unit 11 of the radio base station eNB#1 performs control on communication with the mobile station UE (for example, scheduling control or transmission power control on the mobile station UE in the cell #1). The receiving unit 12 of the radio base station eNB#1 receives various signals from the mobile station UE or the radio base station eNB#2. The transmitting unit 13 of the radio base station eNB#1 transmits various signals to the mobile station UE or the radio base station eNB#2.

The controlling unit 11 of the radio base station eNB#2 performs control on communication with the mobile station UE (for example, scheduling control or transmission power control on the mobile station UE in the cells #2A to #2C). The receiving unit 12 of the radio base station eNB#2 receives various signals from the mobile station UE or the radio base station eNB#1. The transmitting unit 13 of the radio base station eNB#2 transmits various signals to the mobile station UE or the radio base station eNB#1.

Moreover, the controlling unit 11 of the radio base station eNB#1, which is the master radio base station MeNB, performs scheduling control and transmission power control on the mobile station UE in all the cells #1 and #2A to #20 under the control of the plural radio base stations eNB#1 and eNB#2.

The radio base station eNB#1 can set, when setting the "Inter-eNB CA" explained above, a scheduling timing (a scheduling opportunity) for the mobile station UE in the cells #1 and #2A to #2C.

Moreover, the scheduling timing can be expressed with any granularity such as a subframe level, a radio frame level or a symbol level.

Furthermore, the radio base station eNB#1 can set the scheduling timing for the mobile station UE in the cells #1 and #2A to #2C by using RRC signaling or MAC signaling.

Moreover, the radio base station eNB#2 can request the radio base station eNB#1 to perform the scheduling control.

Second Embodiment of Present Invention

Figure 3:
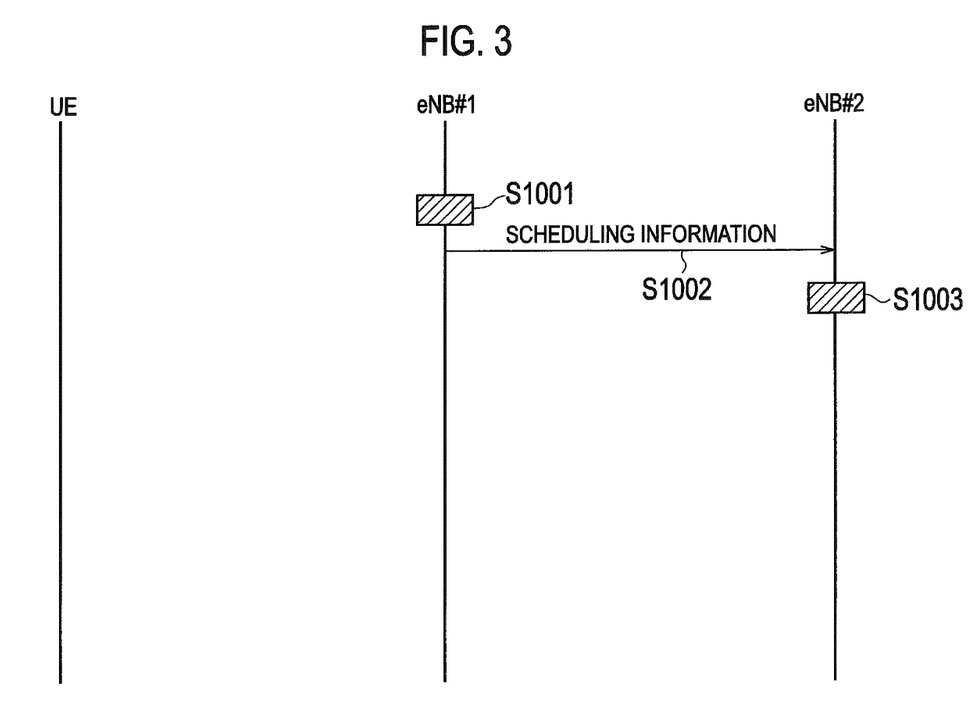
FIG. 3 is a sequence diagram that shows an operation example of a mobile communication system according to a second embodiment of the present invention.
Figure 4:
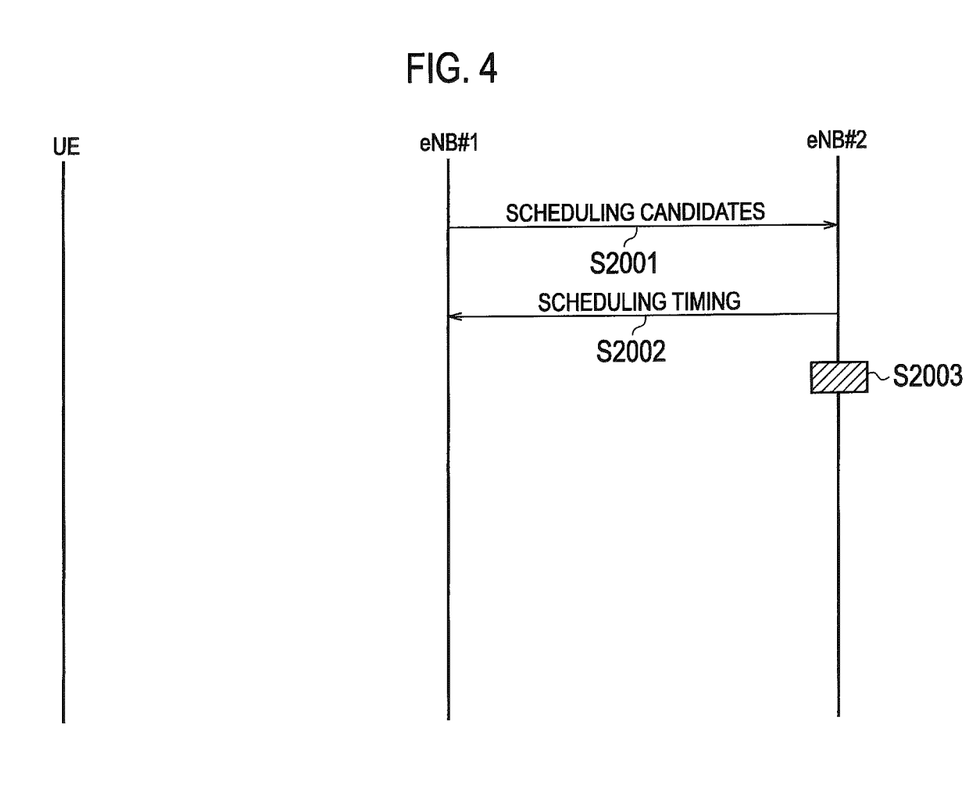
FIG. 4 is a sequence diagram that shows an operation example of the mobile communication system according to the second embodiment of the present invention.
Figure 5:
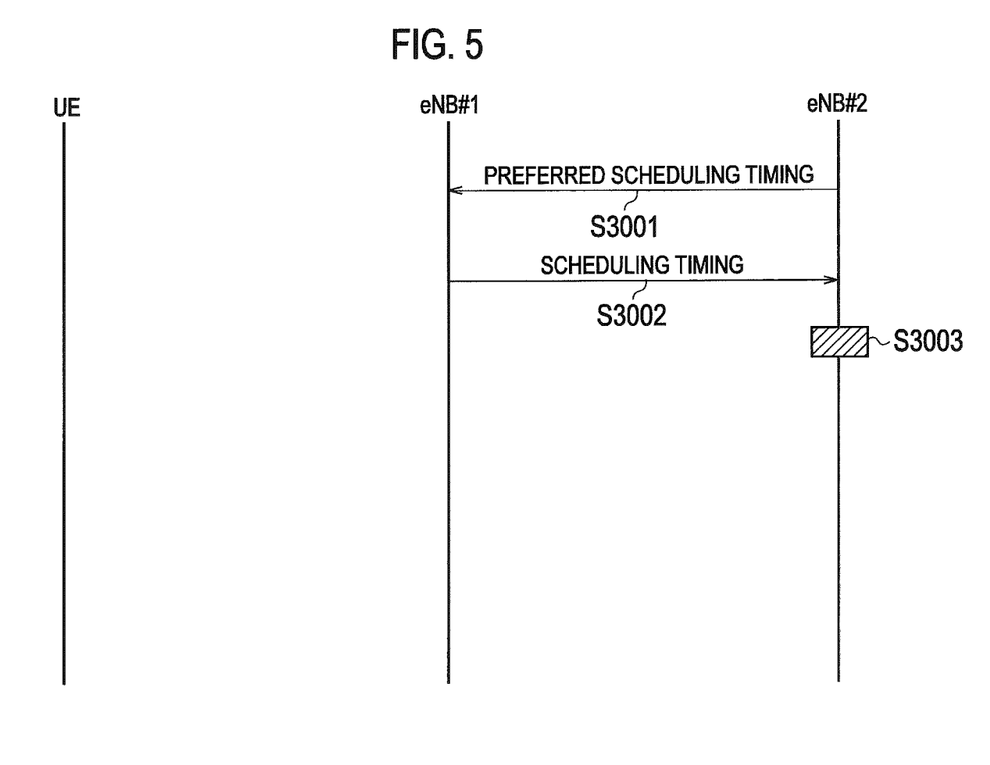
FIG. 5 is a sequence diagram that shows an operation example of the mobile communication system according to the second embodiment of the present invention.

Referring now to FIGS. 3 to 5, a mobile communication system according to a second embodiment of the present invention will be explained below while focusing on the points of difference with the mobile communication system according to the first embodiment.

In the mobile communication system according to the present embodiment, the controlling unit 11 of the radio base station eNB#1 performs the scheduling control and the transmission power control on the mobile station UE in the cell #1 under the control of the radio base station eNB#1. The controlling unit 11 of the radio base station eNB#2 performs the scheduling control and the transmission power control on the mobile station UE in the cells #2A to #2C under the control of the radio base station eNB#2.

Moreover, in the mobile communication system according to the present embodiment, only one among the radio base stations eNB#1 and eNB#2 can perform the scheduling control on the mobile station UE at a same timing (for example, TTI: Transmission Time Interval).

In the mobile communication system according to the present embodiment, scheduling information corresponding to the mobile station UE can be exchanged between the radio base station eNB#1 and the radio base station eNB#2 via an X2 interface.

For example, the scheduling information can be exchanged periodically between the radio base station eNB#1 and the radio base station eNB#2, or the scheduling information can be exchanged among the radio base stations eNB#1 and eNB#2 on specific events such as when uplink data to be sent to each of the radio base stations eNB#1 and eNB#2 is generated in the mobile station UE.

Alternatively, in the mobile communication system according to the present embodiment, the scheduling information corresponding to the mobile station UE can be exchanged between the radio base station eNB#1 and the radio base station eNB#2 via the mobile station UE.

The scheduling information, in addition to the scheduling timing, includes the number of resource blocks to be assigned, and the like.

The exchange of the scheduling information can be set by using the RRC signaling or the MAC signaling.

Referring now to FIGS. 3 to 5, examples of how the mobile communication system according to the present embodiment operates will be explained below.

Firstly, referring to FIG. 3, an operation example 1 of the mobile communication system according the present embodiment will be explained.

As shown in FIG. 3, when the radio base station eNB#1 performs scheduling on the mobile station UE in the cell #1 at step S1001, the radio base station eNB#1 sends scheduling information regarding the scheduling to the radio base station eNB#2 at step S1002.

At step S1003, the radio base station eNB#2 autonomously performs, based on the scheduling information, the scheduling on the mobile station UE in the cells #2A to #2C at an available scheduling timing.

The scheduling information can be valid only for a predetermined period.

In other words, the radio base station eNB#2 can discard the scheduling information once a predetermined period has elapsed from the notification of the scheduling information.

If the predetermined period has elapsed from the notification of the scheduling information, the radio base station eNB#2 can request the radio base station eNB#1 for new scheduling information.

Secondly, referring to FIG. 4, an operation example 2 of the mobile communication system according the present embodiment will be explained.

As shown in FIG. 4, at step S2001, the radio base station eNB#1 notifies the radio base station eNB#2 of scheduling candidates.

The scheduling information can express the scheduling timing with any granularity such as the subframe level, the radio-frame level, or the symbol level.

At Step S2002, the radio base station eNB#2 selects from the scheduling candidates a preferred scheduling timing for scheduling of the mobile station UE in the cells #2A to #2C, and notifies the radio base station eNB#1 of the selected scheduling timing. At step S2003, the radio base station eNB#2 performs the scheduling on the mobile station UE in the cells #2A to #2C at the selected scheduling timing.

Thirdly, referring to FIG. 5, an operation example 3 of the mobile communication system according the present embodiment will be explained.

As shown in FIG. 5, at step S3001, the radio base station eNB#2 notifies the radio base station eNB#1 of a preferred scheduling timing for performing the scheduling of the mobile station UE in the cells #2A to #2C.

At step S3002, the radio base station eNB#1 adjusts the scheduling timing and notifies the radio base station eNB#2 of an available scheduling timing.

At step S3003, the radio base station eNB#2 performs the scheduling on the mobile station UE in the cells #2A to #2C at the notified scheduling timing.

Third Embodiment of Present Invention

Figure 6:
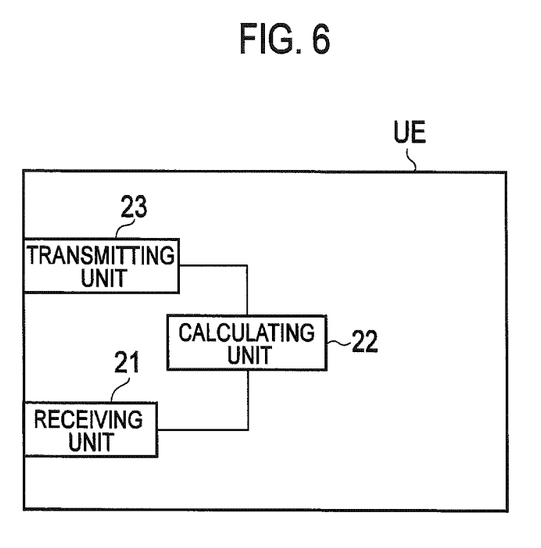
FIG. 6 is a functional block diagram of a mobile station UE according to a third embodiment of the present invention.

Referring now to FIG. 6, a mobile communication system according to a third embodiment of the present invention will be explained below while focusing on the points of difference with the mobile communication systems according to the first and second embodiments of the present invention.

As shown in FIG. 6, a mobile station UE according to the present embodiment includes a receiving unit 21, a calculating unit 22, and a transmitting unit 23.

The receiving unit 21 receives various signals from the radio base stations eNB#1 and eNB#2, and the transmitting unit 23 transmits various signals to the radio base stations eNB#1 and eNB#2.

The calculating unit 22 calculates a change amount of a predetermined variable. The predetermined variable includes $M_{PUSCH,c}$ indicating the number of the resource blocks assigned to the mobile station UE in each of the cells #1 and #2A to #2C under the control of the plural radio base stations eNB#1 and eNB#2; the propagation loss $PL_c$ in each of the cells #1 and #2A to #2C; the electric-power offset value $\Delta_{TF,c}$ determined based on the modulation method and the coding rate used in each of the cells #1 and #2A to #2C; and the correction value for closed loop power control $f_c$ used in each of the cells #1 and #2A to #2C, and the like.

When the calculating unit 22 detects a change in the predetermined variable to be more than a predetermined threshold value, the transmitting unit 23 reports the change amount of the predetermined variable to at least one of the radio base stations eNB#1 and eNB#2.

Moreover, the transmitting unit 23 can report the predetermined variable when the calculating unit 22 detects the change in each element of the predetermined variable to be more than a predetermined threshold value. Also, the transmitting unit 23 can report the predetermined variable when the calculating unit 22 detects the change in the sum of elements of the predetermined variable to be more than the predetermined threshold value.

For example, the transmitting unit 23 can report to any radio base station eNB, in other words, it can report the change amount of the predetermined variable to both the radio base stations eNB#1 and eNB#2.

The transmitting unit 22 can report, when the calculating unit 22 detects the change in the predetermined variable to be more than the predetermined threshold value, the predetermined variable by transmitting the PHR.

Furthermore, the transmitting unit 23 can report the change amount of the predetermined variable in all the cells #1 and #2A to #2C (or, CC#1 and CC#2).

Moreover, the transmitting unit 23 can periodically report the change amount of the predetermined variable explained above.

Furthermore, the radio base station eNB#1 (or the radio base station eNB#2) that receives the report explained above can notify the radio base station eNB#2 (or the radio base station eNB#1) of the contents included in the report via the X2 interface.

Alternatively, the transmitting unit 23 can report the change amount of the predetermined variable in the other radio base station eNB to each of the radio base stations eNB#1 and eNB#2.

In other words, the transmitting unit 23 can report the change amount of the predetermined variable in the radio base station eNB#2 to the radio base station eNB#1 (without reporting the change amount of the predetermined variable in the radio base station eNB#1), and can report the change amount of the predetermined variable in the radio base station eNB#1 to the radio base station eNB#2 (without reporting the change amount of the predetermined variable in the radio base station eNB#2).

Fourth Embodiment of Present Invention

A mobile communication system according to a fourth embodiment of the present invention will be explained below while focusing on the points of difference with the mobile communication systems according to the first to third embodiments of the present invention.

In the mobile communication system according to the present embodiment, a maximum transmission power $P_{CMAX,c}$ of a mobile station in each of the cells #1 and #2A to #2C is reduced.

For example, the radio base station eNB, which is the master radio base station MeNB, can centrally control the maximum transmission power $P_{CMAX,c}$ of the mobile station in each of the cells #1 and #2A to #2C.

Furthermore, by considering a cell radius or QoS, and the like, the maximum transmission power $P_{CMAX,c}$ of the mobile station in each of the cells #1 and #2A to #2C can be determined.

For example, a maximum transmission power $P_{CMAX,c}$ of a mobile station in a cell with a smaller radius (for example, cells #2A to #2C) can be set to a smaller value than a maximum transmission power $P_{CMAX,c}$ of a mobile station in a cell with a larger radius (for example, cell #1).

Alternatively, a maximum transmission power $P_{CMAX,c}$ of a mobile station in a cell (or CC) that transmits data having high QoS such as voice data can be set to a higher value than a maximum transmission power $P_{CMAX,c}$ of a mobile station in a cell (or CC) that transmits data having a low QoS.

Moreover, by limiting a value of the predetermined variable explained above, the maximum transmission power $P_{CMAX,c}$ of the mobile station can be reduced.

The characteristic of the present embodiments explained above can be expressed as follows.

According to a first aspect of the present embodiment, in a mobile communication system in which a mobile station UE is configured to perform "Inter-eNB CA (carrier aggregation)" by using cells #1 and #2A to #2C under the control of plural radio base stations eNB#1 and eNB#2, a specific radio base station eNB#1 among the plural radio base stations eNB#1 and eNB#2 performs scheduling control and transmission power control on the mobile station UE in all the cells #1 and #2A to #2C under the control of the plural radio base stations eNB#1 and eNB#2.

According to the above aspect, when the mobile station UE is performing the "Inter-eNB CA" by using the cells #1 and #2A to #2C under the control of the radio base stations eNB#1 and #2, the radio base station eNB#1 takes into consideration a status of transmission power in the mobile station UE as much as possible thereby appropriately performing the transmission power control on the mobile station UE.

In the first aspect of the present embodiment, the specific radio base station eNB#1 can be a master radio base station MeNB.

According to the above aspect, a situation in which a function that a slave radio base station SeNB should be equipped with becomes complicated can be evaded.

According to a second aspect of the present embodiment, in a mobile communication system in which a mobile station UE is configured to perform "Inter-eNB CA" by using cells #1 and #2A to #2C under the control of plural radio base stations eNB#1 and eNB#2, each of the plural radio base stations eNB#1 and eNB#2 performs scheduling control and transmission power control on the mobile station UE in cells #1 and #2A to #2C under the control of itself, the plural radio base stations eNB#1 and eNB#2 exchange scheduling information on the mobile station UE thereamong, and only one of the radio base stations eNB#1 and eNB#2 performs the scheduling control on the mobile station UE at a same timing.

According to the above aspect, when the mobile station UE is performing the "Inter-eNB CA" by using the cells #1 and #2A to #20 under the control of the radio base stations eNB#1 and #2, the radio base stations eNB#1 and eNB#2 take into consideration a status of transmission power in the mobile station UE as much as possible thereby appropriately performing the transmission power control on the mobile station UE.

In the second aspect of the present embodiment, the scheduling information can be exchanged via the mobile station UE.

According to the above aspect, because the notice is not transmitted via a backhaul line between the radio base station eNB#1 and the radio base station eNB#2, a propagation delay of the exchange of the scheduling information can be evaded.

In the above second aspect of the present embodiment, the scheduling information can be valid only in a predetermined period.

According to a third aspect of the present embodiment, in a mobile communication system in which a mobile station UE is configured to perform "Inter-eNB CA" by using cells #1 and #2A to #2C under the control of plural radio base stations eNB#1 and eNB#2, the mobile station UE reports, when a predetermined variable changes more than a predetermined threshold value, a change amount of the predetermined variable to at least one of the plural radio base stations eNB#1 and eNB#2, the predetermined variable includes number of resource blocks assigned to the mobile station UE in each of the cells #1 and #2A to #2C under the control of the plural radio base stations eNB#1 and eNB#2, a propagation loss in each of the cells #1 and #2A to #2C, an electric-power offset value determined based on a modulation method and a coding rate used in each of the cells #1 and #2A to #2C, and a correction value for closed loop power control (a correction value for closed loop transmission power control) used in each of the cells #1 and #2A to #2C.

According to the above aspect, when the mobile station UE is performing the "Inter-eNB CA" by using the cells #1 and #2A to #2C under the control of the radio base stations eNB#1 and eNB#2, the radio base stations eNB#1 and eNB#2 take into consideration a status of transmission power in the mobile station UE as much as possible thereby appropriately performing the transmission power control on the mobile station UE.

In the third aspect of the present embodiment, the mobile station UE can report the change amount of the predetermined variable in other radio base station eNB to each of the plural radio base stations eNB#1 and eNB#2.

According to the above aspect, it is not necessary to exchange the change amount of the predetermined variable between the radio base station eNB#1 and the radio base station eNB#2 via X2 interface.

According to a fourth aspect of the present embodiment, in a mobile communication system in which a mobile station UE is configured to perform "Inter-eNB CA" by using cells #1 and #2A to #2C under the control of plural radio base stations eNB#1 and eNB#2, a maximum transmission power $P_{CMAX,c}$ of the mobile station UE in each of the cells #1 and #2A to #2C is reduced.

According to the above aspect, when the mobile station UE is performing the "Inter-eNB CA" by using the cells #1 and #2A to #2C under the control of the radio base stations eNB#1 and #2, the radio base stations eNB#1 and eNB#2 take into consideration a status of transmission power in the mobile station UE as much as possible thereby appropriately performing transmission power control on the mobile station UE.

The operations of the radio base station eNB#1, eNB#2, or the mobile station UE can be realized by hardware such as a circuit, can be realized by a software module executed by a processor, or can be realized by the combination of these.

The software module can be arranged in a storage medium having a desired form such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, a CD-ROM, and the like.

The storage medium is connected to a processor so that the processor can read/write information from/in the storage medium. Alternatively, the storage medium can be integrated in a processor. Alternatively, the storage medium and the processor can be arranged in ASIC. The ASIC can be arranged in the radio base station eNB#l, eNB#2, or the mobile station UE. The storage medium and the processor can be arranged as a discrete component in the radio base station eNB#1, eNB#2, or the mobile station UE.

The present invention has been explained in detail by using the above mentioned embodiments; however, it is obvious for a person skilled in the art that the present invention is not limited to the embodiments explained in the present description. The present invention can be implemented by way of modifications and changes without deviating from the gist and the range of the present invention specified by the claims. Accordingly, the indication of the present description aims at exemplary explanation, and has no intention to limit to the present invention.

The entire contents of Japanese Patent Application No. 2013-215481 (filed on Oct. 16, 2013) are incorporated in the description of the present application by reference.

INDUSTRIAL APPLICABILITY

According to the present invention, as explained above, it is possible to provide a mobile communication system that can appropriately perform transmission power control on a mobile station UE when performing "Inter-eNB CA" by using cells under the control of plural radio base stations eNB.

EXPLANATION OF REFERENCE NUMERALS

UE Mobile station
eNB#1/eNB#2 Radio base station
11 Controlling unit
12, 23 Transmitting unit
13, 21 Receiving unit
22 Calculating unit

The invention claimed is:

1. A mobile communication system in which a mobile station performs carrier aggregation comprising:
   a first radio base station that controls a first cell and performs scheduling control and transmission power control on the mobile station in the first cell; and
   a second radio base station that controls a second cell and performs scheduling control on the mobile station in the second cell,
   wherein when the mobile station performs carrier aggregation using the first cell and the second cell, the first radio base station performs scheduling control and transmission power control on the mobile station in the second cell via the second radio base station.

2. The mobile communication system according to claim 1, wherein the first radio base station is a master radio base station.

3. The mobile communication system according to claim 1,
   wherein when the mobile station performs carrier aggregation using the first cell and the second cell, the first radio base station performs the scheduling control and the transmission power control on the mobile station in the first cell.

4. The mobile communication system according to claim 1,
   wherein the second radio base station controls a plurality of second cells and performs scheduling control on the mobile station in the plurality of second cells,
   wherein when the mobile station performs carrier aggregation using the first cell and at least one cell of the plurality of second cells, the first radio base station performs the scheduling control and the transmission power control on the mobile station in the at least one cell via the second radio base station.

5. The mobile communication system according to claim 1, further comprising:
   a third radio base station that controls a third cell and performs scheduling control on the mobile station in the third cell,
   wherein when the mobile station performs carrier aggregation using the first cell, the second cell, and the third cell, the first radio base station performs the scheduling control and the transmission power control on the mobile station in the third cell via the third radio base station.

6. A mobile communication system in which a mobile station is configured to perform carrier aggregation by using cells under control of plural radio base stations, wherein
   each of the plural radio base stations performs scheduling control and transmission power control on the mobile station in a cell under the control thereof,
   the plural radio base stations exchange scheduling information on the mobile station thereamong,
   only one of the radio base stations performs the scheduling control on the mobile station at a same timing, and
   the scheduling information is valid only in a predetermined period.

7. The mobile communication system according to claim 6, wherein the scheduling information is exchanged via the mobile station.

8. A mobile communication system in which a mobile station is configured to perform carrier aggregation by using cells under control of plural radio base stations, wherein
   the mobile station reports, when a predetermined variable changes more than a predetermined threshold value, a change amount of the predetermined variable to at least one of the plural radio base stations,
   the predetermined variable includes
      number of resource blocks assigned to the mobile station in each of the cells under the control of the plural radio base stations,
      a propagation loss in each of the cells under the control of the plural radio base stations, an electric-power offset value determined based on a modulation method and a coding rate used in each of the cells under the control of the plural radio base stations, and a correction value for closed loop transmission power control used in each of the cells under the control of the plural radio base stations.

9. The mobile communication system according to claim 8, wherein the mobile station reports the change amount of the predetermined variable in other radio base station to each of the plural radio base stations.

* * * * *